United States Patent [19]

Moffatt

[11] 3,758,582

[45] Sept. 11, 1973

[54] OXIME ETHER ANTI-DEPRESSANTS

[75] Inventor: John G. Moffatt, Los Altos, Calif.

[73] Assignee: Syntex Corporation, Panama, Panama

[22] Filed: Aug. 14, 1970

[21] Appl. No.: 63,920

[52] U.S. Cl. 260/566 AE, 260/327 R, 260/327 TH, 260/329.2, 260/332.3 R, 260/999, 260/566 R
[51] Int. Cl. C07c 131/00
[58] Field of Search 260/566 AE, 327 R, 260/327 TH, 332.3 R, 566 R

[56] References Cited
UNITED STATES PATENTS 3,454,580  7/1969  Van der Stelt .......... 260/566 AE X
3,526,671  9/1970  Judd ........................... 260/566 AE

*Primary Examiner*—Leon Zitver
*Assistant Examiner*—Gerald A. Schwartz
*Attorney*—Walter H. Dreger and Evelyn K. Merker

[57] ABSTRACT

Compositions containing and methods employing novel alkylthioalkyl oxime ethers and the corresponding nitrones, useful as CNS agents, particularly antidepressants. Methods for preparing these compounds and compositions are also disclosed. O-(Methylthiomethyl)-benzophenone oxime is illustrated as representative of the class.

6 Claims, No Drawings

OXIME ETHER ANTI-DEPRESSANTS

The present invention is directed to oxime ether compounds, compositions containing, and methods utilizing these compounds as CNS agents, particularly as having anti-depressant activity.

The first aspect of the present invention relates to a group of novel oxime ether compounds selected from those represented by the following formulas:

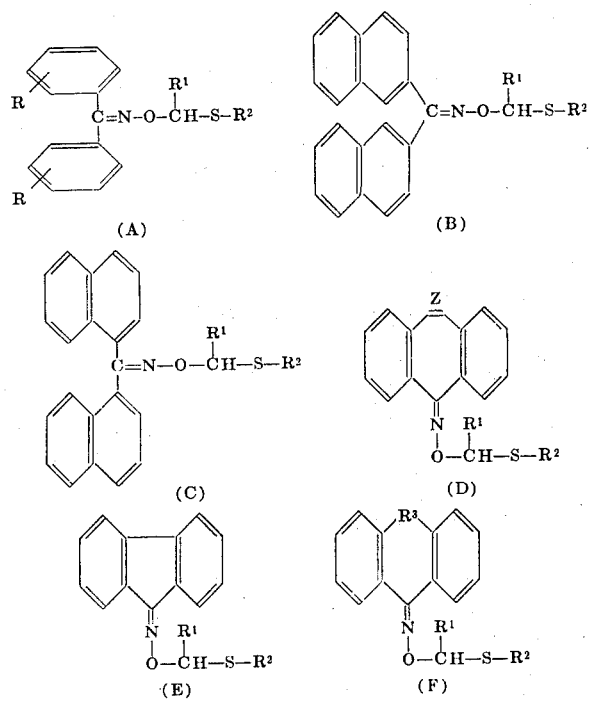

and the corresponding nitrones of the compounds of the above formulas; wherein, each R is the same and in the same respective position of the two corresponding phenyl rings and selected from a group of substituents or one R is hydrogen and the other R is selected from a group of substituents, said group of substituents being hydrogen, alkyl of one to four carbon atoms, halo, nitro, dimethylamino, diethylamino, alkoxy of one to four carbon atoms, or alkylthio of one to four carbon atoms;

$R^1$ is hydrogen, methyl, or ethyl;

$R^2$ is alkyl of one to six carbon atoms, halomethyl, phenyl, monosubstituted phenyl wherein the substituent is halo, nitro, alkyl of one to four carbon atoms, alkoxy of one to four carbon atoms, or halomethyl; or $R^1$ and $R^2$ taken together is ethylene, propylene, or tetramethylene;

$R^3$ is methylene or thio; and

Z is a carbon-carbon single bond or a carbon-carbon double bond;

provided that, in a compound of Formula (A) and its nitrone, when $R^1$ is hydrogen and $R^2$ is methyl, then at least one R is other than hydrogen.

The corresponding nitrones of the above compounds, included within the scope of this invention, can be further described by the following formula:

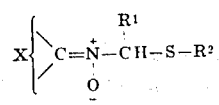

wherein X is the remainder of the nuclei depicted by the above formulas and each of $R^1$ and $R^2$ is as defined above.

The present invention, in a second aspect, is directed to a method of using the compounds of the present invention, or pharmaceutical compositions thereof as described hereinafter, to elicit an anti-depressant effect when administered to an animal in an anti-depressant effective amount. This aspect of the present invention thus relates to a method comprising administering to an animal an anti-depressant effective amount of a compound selected from those represented by Formulas (A), (B), (C), (D), (E), and (F) wherein each R is the same and in the same respective position of the two corresponding phenyl rings and selected from a group of substituents or one R is hydrogen and the other R is selected from a group of substituents, said group of substituents being hydrogen, alkyl of one to four carbon atoms, halo, nitro, dimethylamino, diethylamino, alkoxy of one to four carbon atoms, or alkylthio of one to four carbon atoms;

$R^1$ is hydrogen, methyl, or ethyl;

$R^2$ is alkyl of one to six carbon atoms, halomethyl, phenyl, monosubstituted phenyl wherein the substituent is halo, nitro, alkyl of one to four carbon atoms, alkoxy of one to four carbon atoms, or halomethyl; or $R^1$ and $R^2$ taken together is ethylene, propylene, or tetramethylene;

$R^3$ is methylene or thio; and

Z is a carbon-carbon single bond or a carbon-carbon double bond.

In the practice of this use, the compounds of the present invention, or compositions thereof, can be administered to an animal via any of the usual and accepted methods known in the art, whether parenterally or orally, either singly or in combination with other compounds of this invention or other pharmaceutical agents such as antibiotics, hormonal agents, etc. The administration can be conducted in single unit dosage form for continuous therapy or in single dose therapy. In view of the foregoing as well as in consideration of the degree or severity of the condition being treated, age of patient, and so forth, all of which factors being determinable by one skilled in the art; the dosage can vary over a wide range. Generally, an anti-depressant effective amount ranges from about 1 to about 50 and preferably from about 2 to about 10 mg/kg. of body weight per day.

The compounds of the present invention demonstrate antidepressant activity as measured by a test indicative of such as substantially described by B.M. Askew, *Life Sci.* 2, 725 (1963) and V.G. Vernier et al., *1st Hahnemann Sym. on Psychosomatic Medicine*, Lea and Befiger, 1962, pp. 683 et seq.. This test involves the reversal of reserpine induced hypothermia back to normal mean resting temperature.

The present invention, in a third aspect, is directed to pharmaceutical compositions incorporating an antidepressant effective amount of a compound defined and depicted above. Such compositions will contain the active compound together with a solid or liquid pharmaceutically acceptable non-toxic carrier. Such pharmaceutical carriers can be solids or sterile liquids such as water and oils including those of petroleum, animal vegetable, or synthetic origin, for example, peanut oil, soybean oil, mineral oil, sesame oil, and the like. Water, saline, aqueous dextrose and glycols are preferred liquid carriers particularly for injectable solutions. Suitable pharmaceutical excipients include starch, cellulose, talc, glucose, lactose, sucrose, gelatin, malt, rice, flour, chalk, silica gel, magnesium carbonate, magnesium stearate, sodium stearate, glyceryl monostearate, sodium chloride, dried skim milk, glycerol, propylene glycol, water, ethanol and the like. These compositions take the forms of solutions, suspensions, tablets, pills, capsules, powders, sustained release formulations, and the like. Suitable pharmaceutical carriers are described in "Remingtons Pharmaceutical Sciences" by E. W. Martin. Such compositions will contain an antidepressant effective amount of the active compound together with a suitable amount of carrier so as to prepare the preferred dosage form for proper administration to the host. Typical compositions are prepared by filling standard two-piece gelatin capsules with active compound, lactose, and silica or with a suspension of active compound in mineral oil or by tableting active compound, gelatin, magnesium stearate, and lactose by conventional procedures. By coating the latter, slow release tablets can be prepared.

The compounds of the present invention are prepared by reacting together an oxime corresponding to the compounds depicted above of the partial formula:

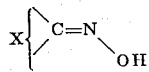

wherein X is as defined above, and a halo, preferably chloro, reagent of the following formula:

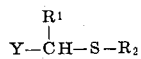

wherein Y is halo and each of $R^1$ and $R^2$ is as defined above and a suitable base, such as an alkali metal hydride, preferably sodium hydride.

The reaction is preferably conducted in an inert liquid organic reaction media including those usually employed in organic chemical reactions such as benzene, diethyl ether, dioxane, tetrahydrofuran, and the like or suitable mixtures of one or more of such media. The reaction is further conducted at temperatures ranging from about −10° to about 100°C. and for a period of time sufficient to complete the reaction ranging from about 0.5 to about three hours.

The reaction consumes the reactants on the basis of one mole of oxime compound per mole each of halo compound and suitable base. However, the amounts of the reactants to be employed are not critical, some of the desired oxime ether products being obtained when employing any proportions thereof. In the preferred embodiments, the reaction is conducted by reacting from about 1.1 to about 1.5 moles of the halo compound and from about 1.1 to about 1.5 moles of base per mole of starting oxime compound. The inert liquid reaction media, if employed, is used in solvent amounts.

In the practice of this step, the oxime and the base are first reacted so as to produce the metal salt of the oxime which is subsequently reacted with the halo compound within the given temperature range for a period of time sufficient to produce product. Following the reaction, the product can be separated and isolated by use of conventional techniques such as extraction, distillation, sublimation, and chromatography. By use of more polar solvents in the chromatographic separation of products, such as ethyl acetate and concentration gradients of ethyl acetate in chloroform, methanol in benzene, etc.; the corresponding nitrone product, which is also prepared in the reaction, can be separated and isolated from the corresponding oxime ether product.

The starting oxime compounds are known and they can be prepared by reaction of the ketone precursor with hydroxylamine hydrochloride in a base such as pyridine. The halo reagent starting compounds are known and they can be prepared, for example, by the α-halogenation of sulfides by known techniques such as those described in Journal of Organic Chemistry 34, 31 (1969), Zhur. Obsh. Khim. 27, 780 (1957), British Patent 772,213, and Journal of American Chemical Society 74, 3594. Alternatively, they can be prepared by the condensation of aldehydes or ketones with mercaptans in the presence of hydrogen chloride as in Ber., 69, 1610 (1936), Ann. 563, 54 (1969) and J. Org. Chem. 34, 31 (1969).

The term "halo" refers to bromo, chloro, fluoro, and iodo; the term "halomethyl" to mono-, di-, or trihalomethyl (halo as above defined), preferably trifluoromethyl. "Alkyl" is branched or straight chain; the various isomers.

The following examples illustrate the method by which the present invention can be practiced.

EXAMPLE 1

A solution of benzophenone (0.1 mole) and hydroxylamine hydrochloride (0.2 mole) in 150 ml. of pyridine is heated to 100°C. and maintained at this temperature for from 30 to 60 minutes. After this time, the mixture is cooled to room temperature and then poured into one liter of ice water. The mixture is filtered and the filtered material washed with water and crystallized from ethanol to prepare the benzophenone oxime product.

In a similar manner, the foregoing procedure can be used to prepare the other oxime starting compounds of the present invention, for example, the following:
4,4'-dimethylbenzophenone oxime,
2,2'-dimethylbenzophenone oxime,
2,2'-dichlorobenzophenone oxime,
4-nitrobenzophenone oxime,
4,4'-dichlorobenzophenone oxime,
3-dimethylaminobenzophenone oxime,
4,4'-dimethoxybenzophenone oxime,
4,4'-di(ethylthio)-benzophenone oxime,
2,2'-di(dimethylamino)-benzophenone oxime,
4,4'-di(butylthio)-benzophenone oxime,
3-t-butylbenzophenone oxime,
2-fluorobenzophenone oxime,
4,4'-difluorobenzophenone oxime,
3,3'-dimethoxybenzophenone oxime, 4,4'-dimethoxybenzophenone oxime,
5,5'-dimethylbenzophenone oxime,
α,α-dinaphthylketone oxime,
β,β-dinaphthylketone oxime,
5-oximinodibenzo[a,d]cycloheptene,
5-oximino-10,11-dihydrodibenzo[a,d]cycloheptene,
9-oximinofluorene,
10-oximinoxanthene, and
10-oximinothioxanthene.

EXAMPLE 2

To a solution of 0.1 mole of tetrahydrothiophene in 10 ml. of carbon tetrachloride is added 0.1 mole of N-chloro-succinimide with stirring. The resultant mixture is kept at about 4°C. for six to seven hours after which time it is evaporated to remove the solvent and distilled in vacuo to provide 2-chlorotetrahydrothiophene.

The foregoing procedure is used to prepare the other chloro reagents of the present invention such as 2-chlorothietane and 2-chlorotetrahydrothiopyran, or the acyclic chain compounds can be prepared by the condensation of aldehydes or ketones with mercaptans and hydrogen chloride according to the method of Bohme as described in *Ber.* 69, 1610 (1936) and *Ann.* 563, 54 (1949). By substitution of N-bromosuccinimide in the above procedure, the corresponding bromo reagents are prepared.

EXAMPLE 3

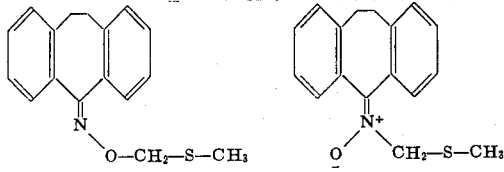

A dispersion of sodium hydride (14 mmol) in mineral oil is washed by centrifugation with hexane several times and then added to a solution of 5-oximino-10,11-dihydrodibenzo-[a,d]cyclopentene (2.25 grams, 10 mmole) in anhydrous benzene (40 ml.). The mixture is stirred at 0°C. for 30 minutes under nitrogen and then chloromethyl methylsulfide (1.3 grams, 13 mmoles) is added in a portionwise fashion while continuing the stirring. The temperature is then raised to and maintained at 80°C. for one hour after which time the mixture is cooled and filtered. The filtrate is washed with aqueous bicarbonate and then with water and dried over magnesium sulfate. The dried mixture is evaporated and the resultant residue dissolved in benzene: hexane (1:1) and applied to a column containing 250 grams of silicic acid. Elution with one liter of benzene: hexane followed by continued elution with benzene gives the 5-[ 0-(methylthiomethyl)-oximino]-10,11-dihydrodibenzo[a,d]-cycloheptene product which can be crystallized from ethanol. Continued elution with a concentration gradient of increasing amounts of ethyl acetate in chloroform gives the corresponding 5-[N-(methylthiomethyl)-imino]-10,11-dihydrodibenzo-[a,d]-cycloheptene N-oxide product.

EXAMPLE 4

A dispersion of sodium hydride (5 mmol) in mineral oil is washed by centrifugation with hexane several times and then added to a solution of benzophenone oxime (1 mmoles) in anhydrous benzene (40 ml.). The mixture is stirred at 0°C. for 30 minutes under nitrogen and then chloromethyl methylsulfide (5 mmoles) is added in a portionwise fashion while continuing the stirring. The temperature is maintained at 80°C. for one hour after which time the mixture is cooled and filtered. The filtrate is washed with aqueous bicarbonate and then with water and dried over magnesium sulfate. The dried mixture is evaporated and the resultant residue dissolved in benzene: hexane (1:1) and applied to a column containing 250 grams of silicic acid. Elution with one liter of benzene:hexane followed by continued elution with benzene gives 0-(methyl-thiomethyl)-benzophenone oxime which can be crystallized from ethanol. Also prepared is the corresponding α,α-diphenyl N-(methylthiomethyl)-nitrone by continued elution with increasing amounts of methanol in benzene.

EXAMPLE 5

A dispersion of sodium hydride (10 moles) in mineral oil is washed by centrifugation with hexane several times and then added to a solution of benzophenone oxime (5 mmoles) in anhydrous benzene (40 ml.). The mixture is stirred for 30 minutes under nitrogen and then 1-chloroethyl methyl-sulfide (1.3 grams, 13 mmoles) is added in a portionwise fashion while continuing the stirring. The temperature is maintained at 80°C. for one hour after which time the mixture is cooled and filtered. The filtrate is washed with aqueous bicarbonate and then with water and dried over magnesium sulfate. The dried mixture is evaporated and the resultant residue dissolved in benzene:hexane (1:1) and applied to a column containing 250 grams of silicic acid. Elution with one liter of benzene:hexane followed by continued elution with benzene gives 0-(1-methylthioethyl)-benzophenone oxime which can be crystallized from ethanol. By continued elution with ethyl acetate:chloroform α,α-diphenyl N-(1-methylthioethyl) nitrone is prepared.

In accordance with the foregoing general procedure, the starting materials listed under Column A below are reacted with the reagents listed under Column B below to prepare the corresponding products listed under C below.

COLUMN A 4,4'-dimethylbenzophenone oxime,
2,2'-dimethylbenzophenone oxime,
2,2'-dichlorobenzophenone oxime,
4-nitrobenzophenone oxime,
4,4'-dichlorobenzophenone oxime,
3-dimethylaminobenzophenone oxime,
4,4'-dimethoxybenzophenone oxime,
4,4'-di(ethylthio)-benzophenone oxime,
2-t-butylbenzophenone oxime,
3,3'-dibromobenzophenone oxime,
4-ethoxybenzophenone oxime,
2,2'-di(butylthio)-benzophenone oxime,
4,4'-dinitrobenzophenone oxime,
4,4'-bis(diethylamino)-benzophenone oxime,
α,α-dinaphthylketone oxime,
β,β-dinaphthylketone oxime,
5-oximinodibenzo[a,d]cycloheptene,
5-oximino-10,11-dihydrodibenzo[a,d]cycloheptene,
9-oximinofluorene,
10-oximinoxanthene,
10-oximinothioxanthene,

COLUMN B 2-chlorotetrahydrothiophene,
1-chloroethyl methylsulfide,
1-chloro-n-propyl ethylsulfide,
chloromethyl n-propylsulfide,
1-chloroethyl phenylsulfide,
chloromethyl 4-chlorophenylsulfide,
1-chloro-n-propyl 2,4-dimethoxyphenylsulfide,
1-chloro-n-propyl 4-ethylphenylsulfide,
chloromethyl 4-trifluoromethylphenylsulfide,
1-chloroethyl 4-nitrophenylsulfide,
chloromethyl trichloromethylsulfide,

COLUMN C 0-(tetrahydrothien-2-yl)-4,4'-dimethylbenzophenone oxime,
0-(tetrahydrothien-2-yl)-2,2'-dimethylbenzophenone oxime,
0-tetrahydrothien-2-yl)-2,2'-dichlorobenzophenone oxime,
0-(tetrahydrothien-2-yl)-4-nitrobenzophenone oxime,
0-(tetrahydrothien-2-yl)-4,4'-dichlorobenzophenone oxime,
0-(tetrahydrothien-2-yl)-3-dimethylaminobenzophenone oxime,
0-(tetrahydrothien-2-yl)-4,4'-dimethoxybenzophenone oxime,
0-(tetrahydrothien-2-yl)-4,4'-di-(ethylthio)-benzophenone oxime,
0-(tetrahydrothien-2-yl)-2-t-butylbenzophenone oxime,
0-(tetrahydrothien-2-yl)-3,3'-dibromobenzophenone oxime,
0-(tetrahydrothien-2-yl)-4'-ethoxybenzophenone oxime,
0-(tetrahydrothien-2-yl)-2,2'-di-(butylthio)-benzophenone oxime,
0-(tetrahydrothien-2-yl)-4,4'-dinitrobenzophenone oxime,
0-(tetrahydrothien-2-yl)-4,4'-bis(diethylamino)-benzophenone oxime,
0-(tetrahydrothien-2-yl)-α,α-dinaphthylketone oxime,
0-(tetrahydrothien-2-yl)-β,β-dinaphthylketone oxime,
5-[0-(tetrahydrothien-2-yl)-oximino]-dibenzo[a,d]cyclo-heptene,
5-[0-(tetrahydrothien-2-yl)-oximino]-10,11-dihydrodibenzo-[a,d]cycloheptene,
9-[0-(tetrahydrothien-2-yl)-oximino]-fluorene,
10-[0-(tetrahydrothien-2-yl)-oximino]-xanthene,
10-[0-(tetrahydrothien-2-yl)-oximino]-thioxanthene,
0-(1-methylthioethyl)-4,4'-dimethylbenzophenone oxime,
0-(1-methylthioethyl)-2,2'-dimethylbenzophenone oxime,
0-(1-methylthioethyl)-2,2'-dichlorobenzophenone oxime, and so forth,
0-(1-ethylthiopropyl)-4-nitrobenzophenone oxime,
0-(1-ethylthiopropyl)-4,4'-dichlorobenzophenone oxime,
0-(1-ethylthiopropyl)-3-dimethylaminobenzophenone oxime, and so forth,
0-(propylthiomethyl)-4,4'-dimethoxybenzophenone oxime,
0-(propylthiomethyl)-4,4'-di-(ethylthio)-benzophenone oxime,
0-(propylthiomethyl)-2-t-butylbenzophenone oxime, and so forth,
0-(1-phenylthioethyl)-3,3'-dibromobenzophenone oxime,
0-(1-phenylthioethyl)-4'-ethoxybenzophenone oxime,
0-(1-phenylthioethyl)-2,2'-di-(butylthio)-benzophenone oxime, and so forth,
0-(4-chlorophenylthiomethyl)-4,4'-dinitrobenzophenone oxime,
0-(4-chlorophenylthiomethyl)-4,4'-bis(diethylamino)-benzo-phenone oxime,
0-(4-chlorophenylthiomethyl)-α,α-dinaphthylketone oxime, and so forth,
0-[1-(2,4-dimethoxyphenylthio)-propyl] β,β-dinaphthylketone oxime,
5-[0-(1-{2,4-dimethoxyphenylthio}-propyl)oximino]-dibenzo-[a,d]cycloheptene,
5-[0-(1-{2,4-dimethoxyphenylthio}-propyl)oximino]-10,11-dihydrodibenzo-[a,d]cycloheptene, and so forth,
9-[0-(1-{4-ethylphenylthio}-propyl)-oximino]-fluorene,
10-[0-(1-{4-ethylphenylthio}-propyl)-oximino]-xanthene,
10-[0-(1-{4-ethylphenylthio}-propyl)-oximino]thioxanthene, and so forth,
0-(4-trifluoromethylphenylthiomethyl)-4,4'-dimethylbenzo-phenone oxime,
0-(4-trifluoromethylphenylthiomethyl)-2,2'-dimethylbenzo-phenone oxime,
0-(4-trifluoromethylphenylthiomethyl)-2,2'-dichloro-benzophenone oxime and so forth,
0-[1-(4-nitrophenylthio)-ethyl]-4-nitrobenzophenone oxime,
0-[1-(4-nitrophenylthio)-ethyl]-4,4'-dichlorobenzophenone oxime,
0-[1-(4-nitrophenylthio)-ethyl]-3-dimethylaminobenzophenone oxime, and so forth,
0-(trichloromethylthiomethyl)-4,4'-dimethoxybenzophenone oxime,
0-(trichloromethylthiomethyl)-4,4'-di-(ethylthio)-benzophenone oxime,
0-(trichloromethylthiomethyl)-2-t-butylbenzophenone oxime, and so forth.

By eluting with a more polar solvent in the reactions for the preparation of the above compounds, the corresponding nitrones thereof are obtained, namely α,α-di(4-methylphenyl) N-(tetrahydrothien-2-yl)nitrone,
α,α-di(2-methylphenyl) N-(tetrahydrothien-2-yl)nitrone, and so forth. Similarly, the 2-thietanyl and tetrahydro-thiopyran-2-yl derivatives of the above compounds both in the oxime ether and nitrone series can be prepared using 2-chlorothietane and 2-chlorotetrahydrothiopyran, respectively. Also thus prepared in accordance with the procedures hereof are:

5-[0-ethylthiomethyl)-oximino]-10,11-dihydrodibenzo-[a,d]-cycloheptene,
5-[N-(ethylthiomethyl-imino]-10,11-dihydrodibenzo-[a,d]-cycloheptene N-oxide, 5-[0-isopropylthiomethyl)- oximino]-10,11-dihydrodibenzo-[a,d]-cycloheptene;
5-[N-(isopropylthiomethyl)-imino]-10,11-dihydrodibenzo-[a,d]-cycloheptene N-oxide,
5-[0-(n-propylthiomethyl)-oximino]-10,11-dihydrodibenzo-[a,d]-cycloheptene, and
5-[N-(n-propylthiomethyl)-imino]-10,11-dihydrodibenzo-[a,d]-cycloheptene N-oxide,
5-[0-(isoamylthiomethyl)-oximino]-10,11-dihydrodibenzo[a,d]-cycloheptene,
5-[N-(isoamylthiomethyl)-imino]-10,11-dihydrodibenzo[a,d]-cycloheptene N-oxide,
5-[0-(t-butylthiomethyl)-oximino]-10,11-dihydrodibenzo[a,d]-cycloheptene, and
5-[N-(t-butylthiomethyl)-imino]-10,11-dihydrodibenzo[a,d]-cycloheptene N-oxide.

What is claimed is:

1. A compound selected from the group consisting of a compound of the formula

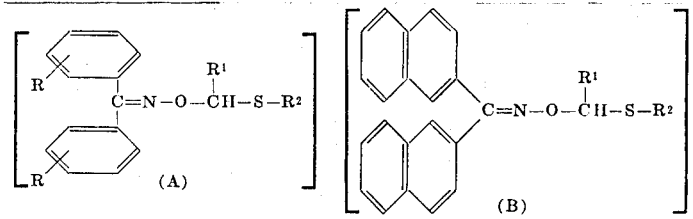

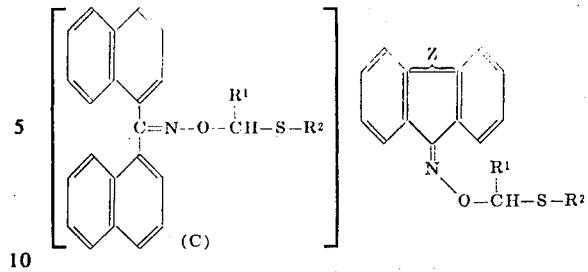

and its corresponding nitrone; wherein, $R^1$ is hydrogen, methyl, or ethyl;

$R^2$ is alkyl of one to six carbon atoms, halomethyl, phenyl, or mono substituted phenyl wherein the substituent is halo, nitro, alkyl of one to four carbon atoms, alkoxy of one to four carbon atoms, halomethyl;

$R^1$ and $R^2$ taken together is ethylene, propylene, or tetramethylene; and

Z is a carbon-carbon single bond or a carbon-carbon double bond.

2. A compound of claim 1 wherein Z is a carbon-carbon single bond.

3. A compound of claim 2 wherein $R^1$ is hydrogen and $R^2$ is methyl.

4. A compound of claim 2 wherein $R^1$ is hydrogen and $R^2$ is ethyl.

5. A compound of claim 2 wherein $R^1$ is hydrogen and $R^2$ is isopropyl.

6. A compound of claim 2 wherein $R^1$ is hydrogen and $R^2$ is n-propyl.

* * * * *